United States Patent [19]
Haydon

[11] 3,909,646
[45] Sept. 30, 1975

[54] ELECTRIC ROTATING MACHINE
[75] Inventor: Arthur W. Haydon, Middlebury, Conn.
[73] Assignee: Tri-Tech, Inc., Waterbury, Conn.
[22] Filed: Feb. 1, 1974
[21] Appl. No.: 438,761

[52] U.S. Cl. .................. 310/83; 310/156; 310/164; 310/257
[51] Int. Cl.² ........................................ H02K 7/116
[58] Field of Search............. 310/41, 156, 162–164, 310/172, 190–193, 83, 89, 91, 257

[56] References Cited
UNITED STATES PATENTS
| | | | |
|---|---|---|---|
| 3,699,282 | 10/1972 | Jepson et al. | 310/164 X |
| 3,808,491 | 4/1974 | Riggs | 310/162 |

*Primary Examiner*—Donovan F. Duggan
*Attorney, Agent, or Firm*—Lee C. Robinson, Jr.

[57] ABSTRACT

An electric rotating machine including a rotor-stator device having a permanent magnet symmetrical rotor and a stator structure. The stator is in capsule form and has a pair of pole pieces and a magnetic flux transmitting structure for transmitting flux to the pair of pole pieces. The flux transmitting structure includes a pair of support members between which the rotor and stator structure are supported. The rotor is journaled for rotation in the support members. A rotatable gear assembly is supported on at least one of the support members and spaced from the rotor and stator structure to provide selective speeds in response to the rotation of the rotor. In one described embodiment the magnetic flux transmitting structure may comprise a generally U-shaped structure.

3 Claims, 9 Drawing Figures

ELECTRIC ROTATING MACHINE

BACKGROUND OF THE INVENTION

This invention relates to an electrical rotating machine of the type usable in small, miniature or fractional horsepower electric motors of the AC signal, stepping or brushless DC type; and, more particularly, to an open frame electric rotating machine of the aforedescribed type wherein the magnetic flux transmitting structure of the machine is employed as a suitable support for appropriate gearing mechanism.

In the manufacture of devices driven by small electrical motors it is generally necessary to provide various types and sizes of electromagnetic coils, gear train assemblies and the like depending upon the particular use, function and environment of the electric motor. Consequently, the manufacturers of such motors frequently were faced with the problems of producing multiple types and sizes of such motors to satisfy the particular needs and requirements of the users.

The foregoing tended to impede the rate of production of small electric motors and, moreover, the inherent ineffeciency in producing various types and sizes of motors resulted in higher costs to the user. However, with the introduction of the unitary rotor-stator capsule device, as disclosed for example, in U.S. Pat. No. 3,564,314 which issued Feb. 16, 1971 to Arthur W. Haydon, the attendant disadvantages previously found in the manufacture of motors, as noted above, were substantially overcome. In accordance with the foregoing patent disclosure, the rotor and stator of small electric motors may be manufactured and produced in a single unit such that standardized sizes may be made at low production costs. The single unit can then be combined with specific electromagnetic coils, gear-train assemblies and the like which are specifically designed to satisfy the particular requirements of the user.

Although the rotor-stator device of the aforenoted patent has succeeded in satisfying a definite need of the industry, many users of such small electric motors often prefer at least some basic form of gear assembly with the motor. Additional and more complex and sophisticated gearing also may be preferred in accordance with particular requirements established by the user. Moreover, if the manufactured motor was capable of delivering but a single output speed, it is manifest that the versatility experienced by the patented rotor-stator device would be largely mitigated and would again necessitate the use of uniquely designed gearing assemblies to accommodate the numerous applications therefor. Hence, the attractiveness of low production costs in manufacturing a small electric motor having a compact rotor-stator capsule device combination with at least some output gearing means, while not limiting the manufactured motor to a specific output speed, is readily apparent.

OBJECTS OF THE INVENTION

Therefore, it is an object of the present invention to provide a machine having a compact rotor-stator capsule device in combination with a rotatable gear assembly, all included in a common structure.

It is another object of the present invention to provide an improved open frame electric motor having both a compact rotor-stator capsule device and output gearing supported by the frame.

A further object of the present invention is to provide an improved electric motor including a compact rotor-stator capsule device supported in structure that transmits magnetic flux to the stator for imparting a driving force to the rotor, and also carries the output gearing for the motor.

A still further object of the present invention is to provide an open frame electric motor having a magnetic flux transmitting structure which carries a gear assembly having a plurality of output shafts which rotate at different speeds.

Another object of this invention is to provide an electro-mechanical timing device having a compact rotor-stator capsule supported in a magnetic flux transmitting frame and including a speed reducing gear assembly; and further having a flexible member cooperating with the frame for indicating when a predetermined gear rotates into a particular angular position.

Yet a further object of this invention is to provide a machine having an improved compact rotor-stator capsule device.

Various other objects and advantages of the invention will become clear from the following detailed description of exemplary embodiments thereof, and the novel features will be particularly pointed out in connection with the appended claims.

SUMMARY OF THE INVENTION

In accordance with a preferred embodiment of this invention, there is disclosed an electric-rotating machine having a compact rotor-stator capsule device supported in a magnetic flux transmitting frame. The frame is adapted to receive magnetic flux from a field coil or other suitable source and to transmit the flux to the capsule device to drive it at a predetermined speed. A gear assembly is supported on the flux transmitting frame and is mechanically coupled to and rotatably driven by the capsule device for providing one or more output speeds.

DETAILED DESCRIPTION OF CERTAIN PREFERRED EMBODIMENTS

Figure 1:
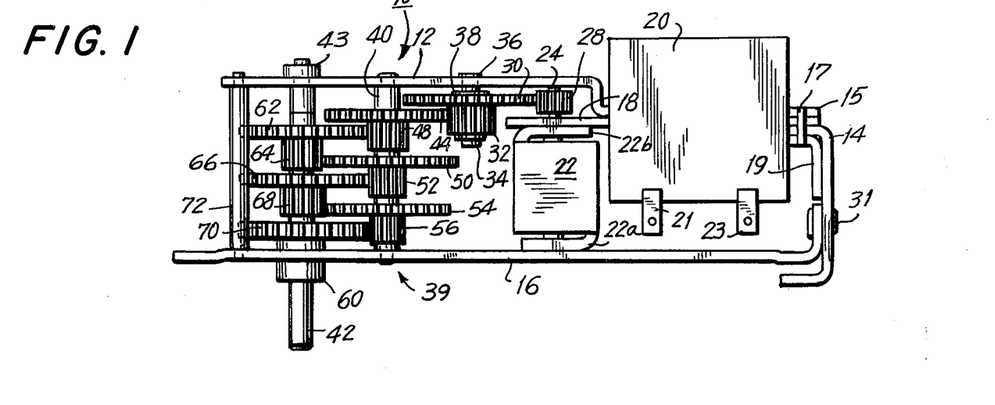
FIG. 1 is a side elevational view of an electric rotating machine in accordance with one illustrative embodiment of the present invention.

Referring to the drawings in more detail, and in particular to FIG. 1, there is illustrated a side elevational view of an open frame electric rotating machine which comprises a magnetic flux transmitting structure 10, a compact rotor-stator capsule device 22 and a gear assembly 39. The structure 10 is comprised of a pair of spaced apart parallel plates 12 and 16, and interconnected legs 14, 18 and 19 which are suitably fastened to the side plates 12 and 16. Side plate 16 and legs 14 and 18 are preferably stamped from cold rolled steel laminated to a suitable thickness. The remaining side plate 12 and leg 19 may be of similar construction if desired. It is recognized that the various side plates and legs of the magnetic flux transmitting structure may, alternatively, be made of other magnetic materials such as powdered iron or other substances capable of providing a suitable magnetic circuit for transmitting magnetic flux.

The side plate 12 is provided with an extension 15 integral therewith and bent in the illustrated configuration to provide a compact structure, as will soon become apparent. The extension 15 and legs 18, 14 and 19 are fastened, as by a suitable strap 17, to overlying configuration. Leg 14 is further connected to the side plate by any conventional screw, bolt, rivet or the like 31, such that the resultant structure 10 exhibits a generally U-shaped configuration. In an alternative embodiment, various ones of the individual legs may be omitted from the magnetic flux transmitting structure and a single U-shaped member having upstanding arms similar to the leg 18 and plate 16, as viewed in FIG. 1, may be provided. In any of the foregoing emodiments the flux transmitting structure is adapted to receive a suitable electro-magnetic coil 20 wound about at least a portion of the structure. As illustrated in FIG. 1, the electro-magnetic coil 20 is here wound about the extension 15 and legs 18, 14 and 19. Suitable electrical connecting terminals 21 and 23 are provided to permit energizing current to be supplied to the coil from appropriate power supplying apparatus, not shown.

The compact rotor-stator capsule device 22 is preferably constructed in accordance with the teachings of the aforenoted U.S. Pat. No. 3,564,314. Accordingly, further description of such rotor-stator device need not be provided. It may merely be noted that the device comprises a permanent magnet cylindrical rotor and a stator structure of generally cylindrical configuration in coaxial relationship with the rotor and forming a housing for the rotor. The stator structure includes a pair of pole pieces 22a and 22b, each having a flat portion and salient poles projecting from the periphery of the flat portion in spaced relationship with the rotor. The stator structure may also include a nonuniform air gap between the stator poles and the rotor and a shading member to provide the rotor with a unidirectional self-starting characteristic upon the application of magnetic flux to the stator poles. An exemplary embodiment of an improved shading member is described in greater detail hereinbelow. The flat portions of the pole pieces 22a and 22b are in flux transmitting contact with the side plate and the leg 18, respectively, of the structure 10.

The rotor is mounted on a shaft 24 which is rotatably carried in bearings, not shown. This shaft extends through at least leg 18 and may be used to drive further apparatus.

The rotor shaft 24 protrudes through the leg 18 and carries an output pinion 28 at its protruding end. The pinion 28 transfers rotary energy to the gear assembly 39 which is here depicted as comprising two sets of gears mounted on shafts 40 and 42, respectively. Each of shafts 40 and 42 extends between the side plates 12 and 16. Alternatively, the shafts may be formed of, and thus integral with, at least one of the side plates, such as plate 12. Although output pinion 28 may be in direct mechanical contact with one of the illustrated sets of gears, an advantageous speed reducing operation may be obtained if the output pinion is coupled to the gear assembly via a speed reducing gear. Accordingly, and as illustrated, gear 30, mounted on stub shaft 34, is in meshing engagement with the output pinion 28. The shaft 34 is journaled for rotation in the side plate 16 and is provided with restraining members 36 and 38 to constrain lateral motion. The stub shaft may, alternatively, be integral with the side plate 16 and gear 30 may be rotatable thereabout. Pinion 32 is secured to gear 30 for rotation therewith.

The shafts 40 and 42, extending between the side plates 12 and 16, if not integral with a side plate, may be journaled for rotation in the side plates. Conventional bearings, such as bearing 43, may be provided for rotation. In alternative embodiments, the shafts are integral with or fixedly secured to the side plates. In any of these embodiments, both shafts are provided with respective gear and pinion combinations disposed along their respective lengths to provide selected output speeds to drive further apparatus, and to progressively reduce the speed developed by the rotor. Accordingly, the shaft 40 is provided with gear 44 which, in this instance, is secured to the shaft by a suitable securing element, not shown, and thus drives the shaft 40 at a determined speed. A pinion 48 is secured to the gear and is rotatable therewith.

A gear 50 in combination with pinion 52 is spaced from the aforedescribed gear and pinion combination 44, 48 and, additionally, a gear and pinion combination 54, 56 is spaced from the gear and pinion combination 50, 52. As illustrated, the gears 50 and 54, together with their associated pinions, are supported by the shaft 40.

In similar fashion, the shaft 42 supports a plurality of gear and pinion combinations, here illustrated as gear and pinion combination 62, 64 and gear and pinion combination 66, 68. A further gear 70 is also supported on the shaft 42, this gear preferably being secured to a rotatable sleeve 60. Each of the illustrated gears and/or pinions are preferably formed of polyurethane, nylon or the like to minimize noise and to facilitate low manufacturing costs. The pinion 48, secured to the gear shaft 44, is disposed in meshing engagement with the gear 62 supported on the shaft 42. As the gear 62 is driven by pinion 48, the pinion 64 secured to gear 62 is rotatable at an identical speed. The pinion 64 is, in turn, disposed in meshing engagement with the gear 50 supported on the shaft 40. The pinion 52 secured to gear 50 is disposed in meshing engagement with the gear 66. As is understood, the pinion 52 rotates at the same speed as the gear 50. Pinion 68, secured to gear 66, is disposed in meshing engagement with gear 54. The latter gear is secured to pinion 56, which pinion is disposed in meshing engagement with gear 70. If desired, the illustrated gear assembly 39 may be conveniently housed in a pear-shaped gear box of the type referred to in U.S. Pat. No. 3,495,113 which issued to Arthur W. Haydon.

As is readily apparent, the illustrated gearing arrangements admit of a cooperating relationship whereby a gear is driven by an immediately preceding pinion and the speed of the driven gear is imparted to the pinion secured thereto. In this manner, speed reduction is obtained. As an example, if each gear is here assumed to comprise 4 times as many teeth about its periphery as an associated driving pinion, it is apparent that a four to one reduction in speed is obtained therebetween. Thus, if each gear is driven at one-fourth the speed of its associated driving pinion, and if sleeve 60 is coupled to gear 70 and considered to be an output device, it is readily apparent that the output speed developed by the sleeve 60 is reduced from the speed developed by the shaft 24 by a factor here of $4^7$. Of course, the actual speed reducing factor is a function of the individual relationships between each gear and its immediately preceding driving pinion. Hence, any desirable output speed may be derived merely by selecting appropriate gear-to-pinion ratios in the respective gearing arrangements. As will be described hereinbelow, particular gear-to-pinion ratios may be selected to derive appropriate output speeds at selected gears in accordance with a particular application of the instant invention. Moreover, and is appreciated from an understanding of FIG. 1, the individual gears 44, 50, 54, 62, 66 and 70 exhibit unique speeds whereby selected ones may be utilized to drive further apparatus, not shown, at desired speeds. Hence, these individual gears may be mechanically coupled to associated output shafts or, alternatively, may be disposed in meshing engagement with mating devices to be driven.

In accordance with the foregoing description, it may be appreciated that selected gear and pinion combinations may be journaled for rotation about their respective shafts 40, 42. Consequently, suitable spacing members, not shown, may be provided on the respective shafts to restrain lateral movement of the gear and pinion combinations. Such spacing members are, of course, well known to those of ordinary skill in the art and, therefore, further description thereof need not here be provided.

Additionally, preselected ones of the gear and pinion combinations may be releasably secured to their respective support shafts to thereby drive the shafts at corresponding speeds, if desired. For example, if the shaft 42 is to be driven at the speed developed by gear 70, the gear may be releasably secured to the shaft, as by a set screw or other conventional securing element. Similarly, if the shaft 42 is to be driven at the speed developed by the gear 66, that gear, or alternatively, pinion 68 secured to the gear, may be releasably secured to the shaft. Likewise, should shaft 42 be driven at the speed developed by gear 62, it is now recognized that gear 62, or pinion 64, may be releasably secured to the shaft. The foregoing explanation is equally applicable with regard to the driving of shaft 40 at a selected speed determined by any one of gears 44, 50 and 54.

In accordance with the exemplary embodiment illustrated in FIG. 1, it is readily appreciated that the structure shown exhibits the desirable capability of driving plural output devices at preselected operating speeds. Thus, the shaft 24, which is driven at the speed developed by rotor-stator device 22, may be employed to drive a first output device at a first speed. The shaft 34, which rotates at the reduced speed developed by the gear 30, may be employed to drive a second output device at a second speed. The shaft 40, which rotates at the reduced speed developed by the gear 44, or at a preselected speed developed by a selected one of gears 44, 50 or 54, may be employed to drive a third output device at a third speed. The shaft 42, which rotates at the preselected reduced speed developed by a selected one of gears 62, 66 or 70, releasably secured thereto, may be employed to drive a fourth output device at a fourth speed. Similarly, the sleeve 60, secured to the gear 70 ana rotatable at the reduced speed developed by that gear, may be employed to drive a fifth output device at a fifth speed. Therefore, it is now readily appreciated that selected gears of the first and second illustrated gearing arrangements exhibit selected speeds which may be advantageously utilized to drive respective output devices at corresponding speeds. Although not specifically shown herein, it is, of course, understood that each of the gear and pinion combinations rotatable about a respective shaft 40, 42 may be secured to a rotating sleeve, similar to sleeve 60, which, in turn, may be mechanically coupled to further apparatus.

The operation of the exemplary embodiment depicted in FIG. 1 will now be briefly described. As disclosed in aforenoted U.S. Pat. No. 3,564,314, the compact rotor-stator capsule device 22 may operate as a small AC synchronous motor or, alternatively, as a brushless DC motor, depending upon the manner in which electro-magnetic coil 20 is energized. Thus, the former operation is achieved if the coil 20 is supplied with an alternating current to generate a correspondingly periodic alternating magnetic flux. If the coil 20 is supplied with a series of direct current pulses of alternating polarity, a corresponding magnetic flux is generated thereby and the rotor-stator device 22 operates as a brushless DC motor. Additionally, the rotor-stator device may be operated as a stepper motor whereby shaft 24 rotates a full 360 mechanical degrees for each electrical input pulse applied to the electro-magnetic coil 20. As is understood, a permanent magnet, not shown, may be provided to generate a biasing magnetic flux to the device 22 which is opposite to, but less than, the magnetic flux provided when coil 20 is energized. The stepping operation obtains as a result of the addition of the permanent magnet.

The magnetic flux supplied to the magnetic flux transmitting structure in response to the energization of coil 20 is transferred to the pole pieces 22a and 22b included in the stator structure of the rotor-stator device 22 and in flux communication with side plate 16 and leg 18, in the well-known manner. It is appreciated that leg 18 in combination with leg 14 fastened thereto and side plate 16, fastened to the leg 14 provide, in conjunction with the stator structure of device 22, a suitable magnetic circuit for the communication of magnetic flux. Additionally, the side plate 16, together with side plate 12, provide suitable support for the illustrated gear assembly 39.

The supply of magnetic flux to the structure 10 serves to energize the stator structure included in the device 22 to thereby magnetically drive the rotor in a unidirectional manner. It is recognized that the angular velocity of the rotor is a function of the frequency of the current supplied to the coil 20 as well as a function of the number of poles included in the device 22. The motive force generated by the rotor included in device 22 and manifested by the rotation of shaft 24 is transformed by pinion 28 to gear 30 to thereby drive the gear at an appropriate speed. The developed motive force is further transferred to the illustrated gear assembly by the interaction of pinion 32 and gear 44 to thus drive the respective gear and pinion combinations as well as the shafts 40, 42 and the output sleeve 60 at the selected speeds. Thus, plural output devices may be simultaneously driven at selected, individual speeds, in accordance with the particular gear, shaft or sleeve to which each output device is coupled.

Although the foregoing description of FIG. 1 has assumed a speed reducing function performed by the illustrated gear assembly, in an alternative embodiment appropriate gear and pinion combinations are disposed in various driving relationships to obtain selected speed increasing functions. An increase in speed is developed if a pinion is driven by a larger diameter gear. Thus, to obtain such speed increase, appropriate ones of the illustrated pinions are driven by immediately preceding gears to effect the desired result. By selecting appropriate ratios between a pinion and its immediately preceding driving gear, the appropriate increase in output speed may be derived.

Figure 2:
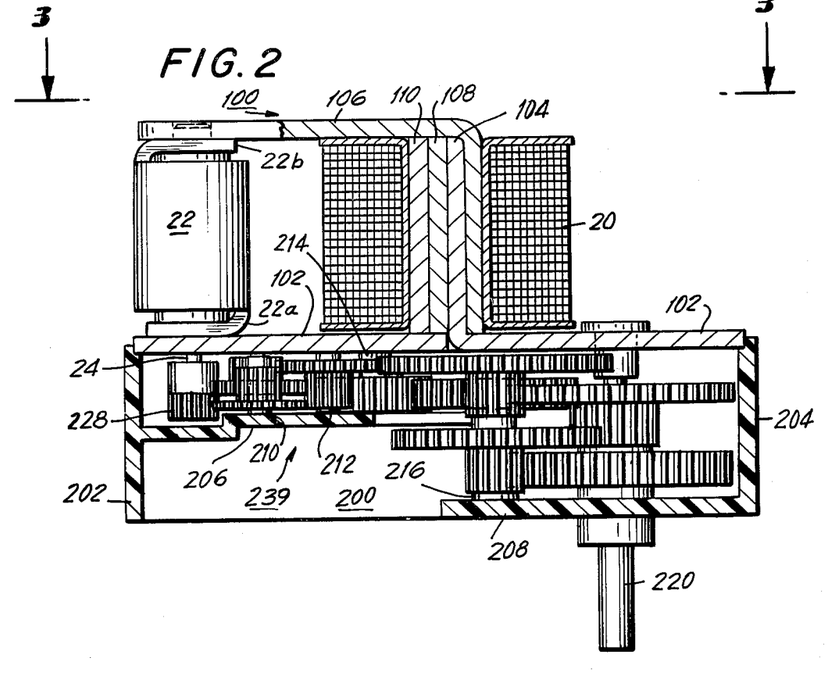
FIG. 2 is a side view of another illustrative embodiment of the novel electric rotating machine of the present invention.
Figure 3:
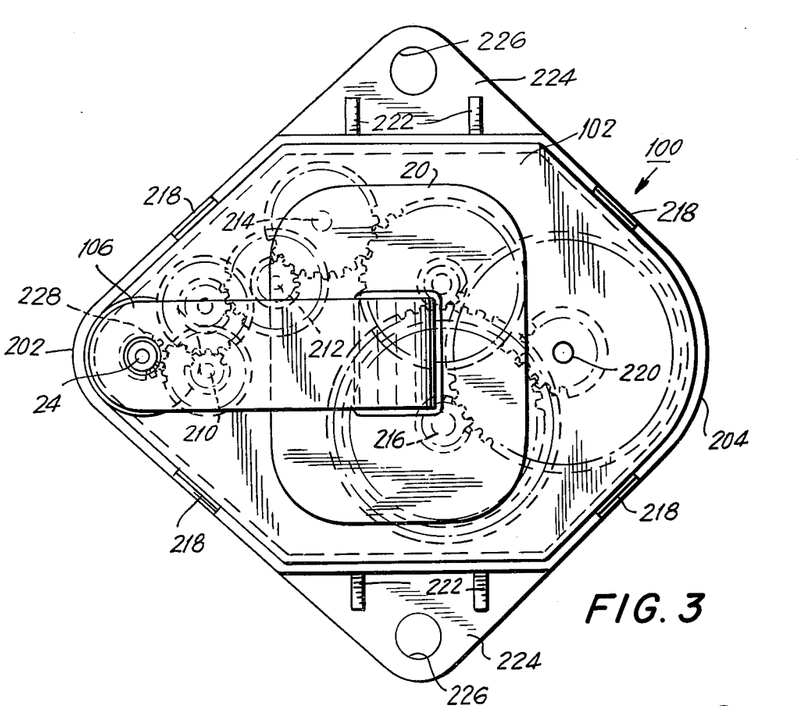
FIG. 3 is a front view of the electric rotating machine depicted in FIG. 2.

Referring now to FIGS. 2 and 3, there are illustrated sectional end top views of another embodiment of the instant invention advantageously admitting of further compact construction and comprising a magnetic flux transmitting structure 100, a compact rotor-stator capsule device 22, and electro-magnetic coil 20 and a gear assembly 239. The magnetic flux transmitting structure 100 is here depicted as comprising a base plate 102 formed with an upstanding L-shaped member 104 integral with the base plate. An additional L-shaped member or leg 106 is provided in contacting relationship with the member 104. As is illustrated, a portion of the leg 106 is spaced from and approximately parallel with a portion of the base plate 102. The leg and plate are made of magnetic materials. The coil is wound about the upstanding member 104 and a portion of the leg 106. Additional mambers 108 and 110, such as spacer elements, are provided as necessary.

The rotor-stator device 22 is identical to that described hereinabove with respect to FIG. 1 and, as illustrated, is mounted on the shaft 24, the latter extending through the base plate 102 and optionally through the L-shaped leg 106. Additionally, the pole pieces 22a and 22b of the stator structure included in device 22 are in magnetic communication with the plate 102 and the leg 106, to thereby receive magnetic flux, whereby the rotor included in device 22 may be magnetically driven in angular rotation. An output pinion 228 is secured to shaft 24 and admits of meshing engagement with the gear assembly 239 to thereby impart rotary movement to the gear assembly.

bottom gear assembly housing 200 is provided preferably of plastic construction, having side walls 202 and 204, a partitioning wall 206 and a buttom wall 208. The housing 200 cooperates with the base plate 102 to provide a compartment, defined by the partitioning wall 206 and the base plate, for the gear assembly. Accordingly, protuberances 218 are provided on the side walls 202 and 204, to suitably position the housing 200 and the base plate 102 whereby the base plate serves as a cover for the housing.

A plurality of gear studs, some of which are identified as studs 210, 212 and 214, are formed of, and thus integral with, the upper surface of the partitioning wall 206. The gear studs receive and support corresponding gear and pinion combinations included in the gear assembly 239. An additional gear stud 216 is formed of the bottom wall 208 for supporting a plurality of gear and pinion combinations, here illustrated as two such combinations, for providing a speed reducing function. An output shaft 220 is journaled for rotation in the base plate 102 and the bottom wall 208 and extends therefrom to drive other apparatus, not shown, if desired. It may be appreciated that the output shaft can be journaled for rotation in the partitioning wall 206 and, if desired, the illustrated bottom wall 208 may be omitted.

The gear assembly housing 200 is mounted on a suitable mounting base 224 which may be of integral construction with the side walls 202 and 204. Bracing members or ribs 222 may be provided and suitable mating holes 226 are formed in the mounting base to permit the illustrated rotating machine to be secured, as desired, to additional apparatus.

Base plate 102 is preferably provided with mating holes of apertures aligned with the various gear studs of the gear assembly housing to receive such gear studs. Thus, the base plate is seen to accomplish the dual purpose of providing a magnetic flux transmission path and supporting the gear assembly 239. The output shaft 220 of the gear assembly is journaled for rotation in the associated hole of the base plate. It is to be understood that, although not specifically shown herein, suitable bearings are provided to permit the rotation of the appropriate shafts, such as shafts 24 and 220. Of course, the gear and pinion combinations supported on the described gear studs of the housing 200 are adapted to rotate about such studs.

As is appreciated, the illustrated gearing arrangement is configured for speed reduction. The output shaft 220 may, additionally be provided with a sleeve member to thus provide two selective reduced output speeds at the shaft and at the sleeve, if desired. Furthermore, selected ones of the gears or pinions included in the assembly 239 may be provided in meshing engagement with external devices, not shown, to correspondingly drive such devices at selectively reduced speeds. If desired, the illustrated housing 200 may be a pear-shaped gear box of the type referred to in aforenoted U.S. Pat. No. 3,495,113.

The operation of the rotating machine represented in FIGS. 2 and 3 is recognized as being substantially similar to that depicted in FIG. 1 and, therefore, need only be briefly described. The energization of the coil 20 results in the generation of magnetic flux through the magnetic circuit comprised of the L-shaped leg 106, the L-shaped member 104, the base plate 102 and the pole pieces 22a and 22b. Consequently, the stator structure included in the device 22 is energized to magnetically drive the rotor. Pinion 228 transfers the motive force developed by the rotor to the gear assembly 239 supported in the housing 200. In accordance with the speed reducing ratio, selected as a choice of gear and pinion design, reduced output speed is derived at the output shaft 220. Additionally, any predetermined reduced speed may be exploited at a corresponding gear or pinion, or at an output sleeve, not shown. As one numerical example, if the rotor operates at 3,600 rpm, an output speed of ¼ rpm may be derived at the output shaft.

It is appreciated that the rotation of the various gear and pinion combinations about the gear studs extending between the partitioning wall 206 and the base plate 102 is conventional and need not be described herein. Hence, a compact rotating machine is illustrated wherein the base plate 102 serves to provide a flux transmitting path to the device 22 and a support for the gear and pinion combinations mounted on the illustrated gear studs. The gear assembly housing 200 may be completely enclosed and thus shielded from foreign matter and undesired effects, merely by placing a suitable plate member, such as a dust cover or the like, over those portions of the housing that expose the assembly 239, by molding a web, not shown, connecting the partitioning wall 206 to the bottom wall 208.

Figure 4:
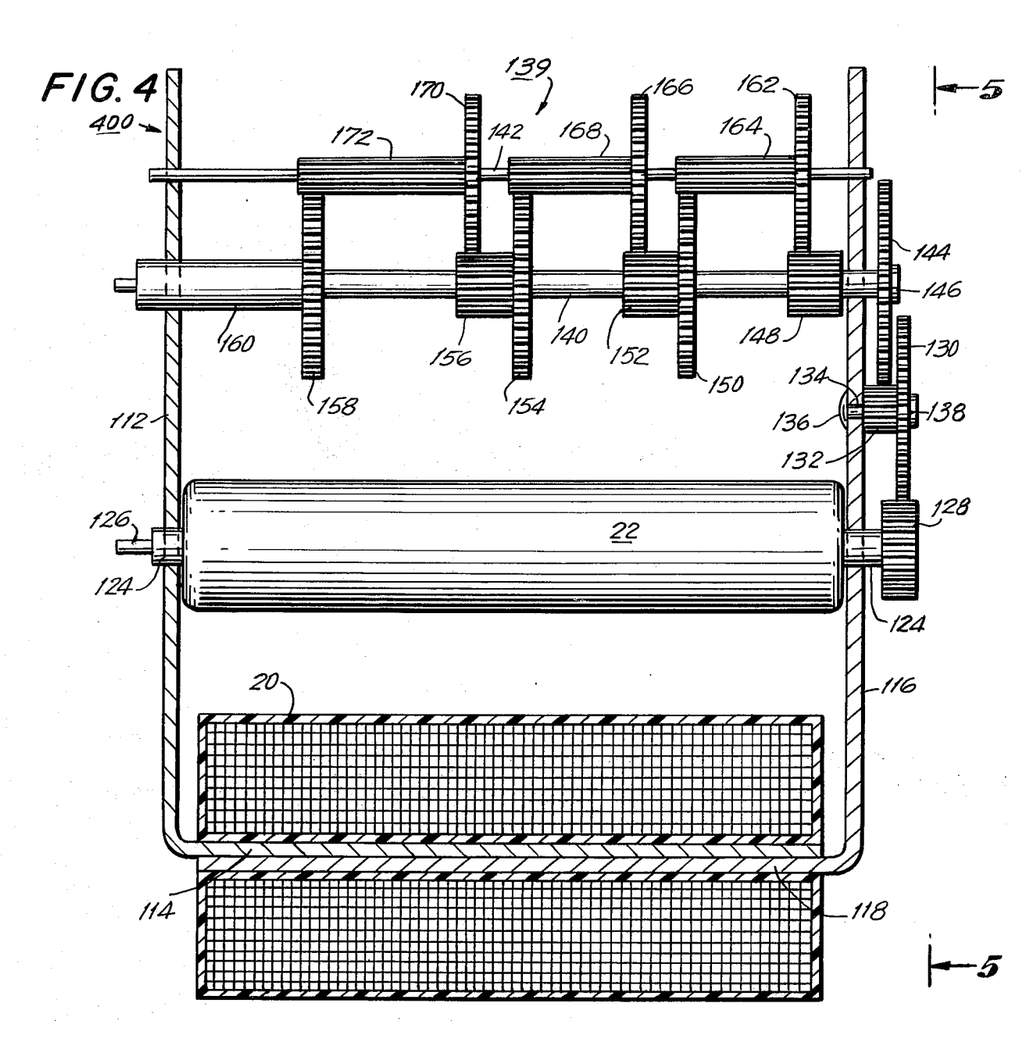
FIG. 4 is a side view of a further illustrative embodiment of the electric rotating machine in accordance with the present invention.
Figure 5:
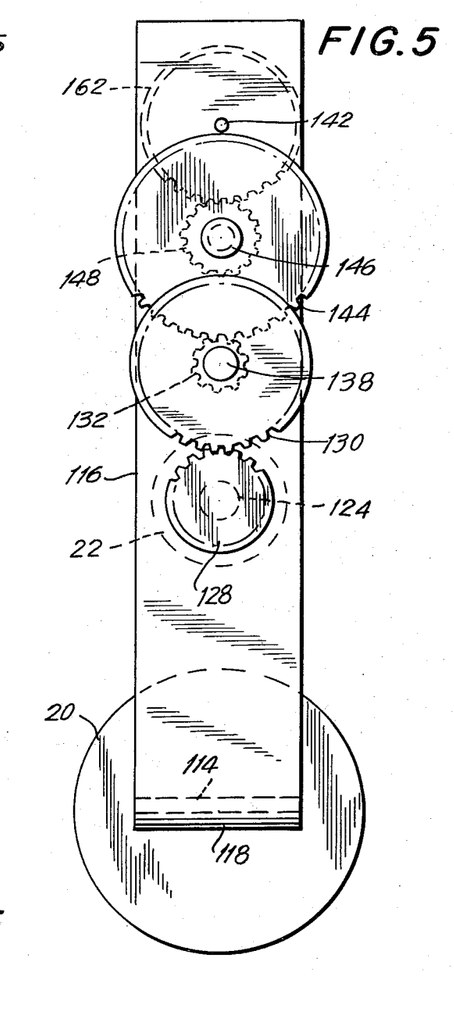
FIG. 5 is a front view of the electric rotating machine depicted in FIG. 4.

Referring now to FIGS. 4 and 5, side and top views of another embodiment of the electric rotating machine of the present invention are shown. A magnetic flux transmitting structure 400 is comprised of a pair of spaced apart parallel plates 112 and 116 and interconnected legs 114 and 118 which are integral with the side plates 112 and 116, respectively, and are disposed in overlying configuration. The magnetic flux transmitting structure is made of magnetic material capable of providing a suitable magnetic circuit for transmitting magnetic flux.

The side plate 112 and its interconnecting leg 114 as well as the side plate 116 and its interconnecting leg 118 are in the form of L-shaped members having relatively shorter legs 114, 118 and relatively longer plates 112, 116. In an alternative embodiment the magnetic flux transmitting structure comprises a single U-shaped member having upstanding arms similar to the plates 112 and 116, as viewed in FIG. 4, and a cross arm therebetween. In any of the foregoing embodiments the flux transmitting structure is adapted to receive an electro-magnetic coil 20 wound about the interconnecting or intermediate portion of the structure. As illustrated in FIGS. 4 and 5, the electro-magnetic coil 20 is here wound about the legs 114 and 118.

The compact rotor-stator capsule device 22 is identical to the device shown in FIGS. 1–3 and to simplify the drawings, the pole pieces 22a and 22b are not shown. As is now understood, the rotor is mounted on a shaft 124 which is rotatably carried in bearings, not shown. This shaft is journaled for rotation in at least one of the plates and here protrudes through the side plate 116, carrying an output pinion 28 at its protruding end to transfer rotary energy to the gear assembly 139 which is here depicted as comprising two sets of gears mounted on shafts 140 and 142, respectively. Each of shafts 140 and 142 extends between the side plates 112 and 116. The output pinion 128 is coupled to the gear assembly via a speed reducing gear 130. The gear 130 is mounted on stub shaft 134, the shaft being supported in the side plate 116 and being provided with restraining members 136 and 138 at its opposite ends to constrain lateral motion. Pinion 132 is secured and thus rotatable with gear 130.

The shafts 140 and 142 are provided with respective gear and pinion combinations disposed along their respective lengths to provide selected output speeds to drive further apparatus, and to progressively reduce the speed developed at the shaft 124 in the now understood manner. Accordingly, gear and pinion combinations 144, 148; 162, 164; 150, 152; 166, 168; 154, 156; and 170, 172 are disposed in the illustrated speed reducing configuration. The gear 144 is here illustrated as being disposed externally of the magnetic flux transmitting structure 400.

It may be appreciated that selected gear and pinion combinations may be journaled for rotation about their respective shafts 140, 142. Consequently, suitable spacing members, not shown, may be provided on the respective shafts to restrain lateral movement of the gear and pinion combinations. Such spacing members are, of course, well known to those of ordinary skill in the art and, therefore, further description thereof need not here be provided.

Additionally, preselected ones of the gear and pinion combinations may be releasably secured to their respective support shafts to thereby drive the shafts at corresponding speeds, if desired. For example, if the shaft 142 is to be driven at the speed developed by gear 170, the gear may be releasably secured to the shaft, as by a set screw or other conventional securing element. Alternatively, the pinion 172, which is secured to the gear 170, may be releasably secured to the shaft 142. Similarly, if the shaft 142 is to be driven at the speed developed by the gear 166, that gear, or alternatively, pinion 168, may be releasably secured to the shaft. Likewise, should shaft 142 be driven at the speed developed by gear 162, it is now recognized that gear 162, or pinion 164, may be releasably secured to the shaft. Although not specifically shown herein, it is, of course, understood that each of the gear and pinion combinations rotatable about a respective shaft 140, 142 may be secured to a rotating sleeve, similar to sleeve 160, which, in turn, may be mechanically coupled to further apparatus.

The operation of the rotating machine illustrated in FIGS. 4 and 5 is substantially similar to that described hereinabove with respect to FIGS. 1–3 and further detailed description is not necessary. It is noted that the magnetic flux supplied to the magnetic flux transmitting structure 400 in response to the energization of coil 20 is transferred to the pole pieces included in the stator structure of the rotor-stator device 22, in the well-known manner. It is appreciated that parallel plate 112 in combination with interconnecting leg 114, interconnecting leg 118 and parallel plate 116 provide, in conjunction with the stator structure of device 22, a suitable magnetic circuit for the communication of magnetic flux. Additionally, the parallel side plates 112 and 116 provide suitable support for the illustrated gear assembly 139.

Figure 6:
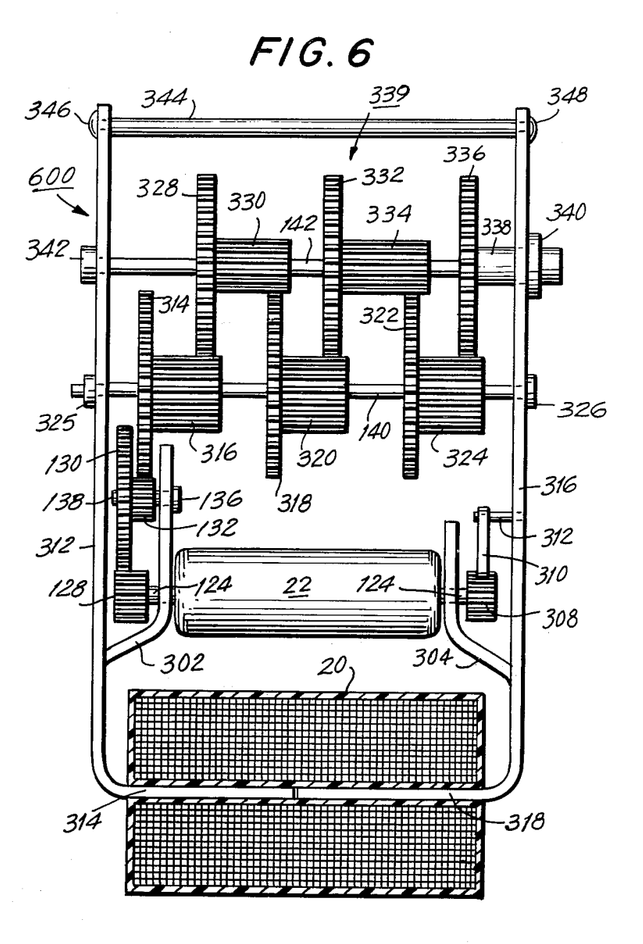
FIG. 6 is a side view of another illustrative embodiment of the electric rotating machine of the present invention.

Turning now to FIG. 6, there is illustrated a side view of yet another embodiment of the electric rotating machine in accordance with the present invention. As illustrated, the machine comprises magnetic flux transmitting structure 600, electro-magnetic coil 20 wound about a portion of the flux transmitting structure, a compact rotor-stator capsule device 22 and gear assembly 339. The structure 600 is here depicted as comprising a U-shaped member formed of two abutting L-shaped members, each L-shaped member being comprised of a relatively shorter leg 314, 318 and a relatively longer leg 312, 316. As illustrated, the relatively shorter legs 314, 318 admit of an abutting relationship. Consequently, the resulting U-shaped member is formed of upstanding legs 312, 316. Legs 312 and 316 are provided with respective sections 302 and 304 that are displaced from and integral with their legs. Sections 302 and 304 may thus be cut or stamped from the legs and deformed to the illustrated configurations. Shaft 124, upon which the rotor-stator device 22 is mounted, is journaled for rotation in sections 302 and 304. A pinion 308 is secured to shaft 124 to provide, in combination with pawl 310, a mechanical detent or "no back" device. Such mechanical detent serves to prevent any opposite rotation of the rotor-stator device 22 to thus improve the starting characteristics thereof. The pawl 310 is mounted upon a shaft 312 and is spring biased to permit the pinion 308 to rotate in only a single direction. The pawl is adpated to prevent any counterrotation of the pinion by engaging a pinion tooth.

The motive force generated by the rotor included in the device 22 is transferred to the illustrated gear assembly 339 by the combination of output pinion 128, gear 130 and pinion 132. The output pinion 128 is secured to the shaft 124 and is disposed in meshing engagement with the gear 130. The latter gear is secured to the pinion 132 and is mounted upon the shaft 134 journaled for rotation in section 302. This shaft is thus provided with suitable bearings 136 and 138. It is recognized that, if desired, the shaft 134 may extend between legs 312 and section 302. Any one or more of gear 130, pinion 132 and shaft 134 may be mechanically coupled to an output device, not shown, for suitably driving that device at an appropriate speed. It is recognized that the speed reducing ratio exhibited by the gear 130 and its driving pinion 128 effectively reduces the speed of the gear from that developed at shaft 124.

The gear assembly 339 mounted in the structure 600 is comprised of individual gearing arrangements supported on shafts 140 and 142, respectively. Such gearing arrangements are comprised of plural gear and pinion combinations disposed in speed reducing configurations whereby a gear is rotatably driven by an immediately preceding pinion. Consequently, the speed of each gear is reduced from that of its driving pinion in accordance with the speed reducing ratio therebetween. As is apparent, the pinion 132 is disposed in meshing engagement with a gear 314, the latter gear being supported upon the shaft 140 and additionally secured to a pinion 316. The pinion 316 drives a gear 328, the latter gear being supported upon the shaft 142. A pinion 330 secured to the gear 328, drives a gear 318; a pinion 320, secured to the gear 318, drives a gear 332; a pinion 334, secured to the gear 332, drives a gear 332; and a pinion 324, secured to the gear 322, drives a gear 336. Shaft 140 extends between the legs 312 and 316 and is supported in suitable bearings 325 and 326, respectively, to permit the shaft to rotate therein. Similarly, shaft 142 extends between the legs 312 and 316 and is journaled for rotation in suitable bearings 340 and 342.

It is recognized that the shaft 140 may be rotated at the speed developed by any one of the gears 314, 318 and 320, merely by securing the appropriate gear to the shaft. To facilitate variations in the shaft velocity, the gears may be releasably secured to the shaft. Similarly, shaft 142 may be rotated at the speed of any one of the gears 328, 332 and 336 merely be securing the appropriate gear to the shaft. By advantageously employing any conventional releasable securing mechanism, the velocity of shaft 142 may be altered as desired. Additionally, the gear 336 is secured to an output sleeve 338 whereby a further device, not shown, may be driven at the speed developed by gear 336.

Also illustrated in FIG. 6 is at least one spacer member 344 disposed between the legs 312 and 316 of the structure 600 and secured to the legs by suitable fasteners 346 and 348, respectively, such as screws, bolts, rivets or the like. It is appreciated that additional spacer members may be provided to assure the appropriate spacing of the side members and that any conventional fasteners may be provided to secure the spacer members to the side members.

It is manifest that the illustrated open frame electric-rotating machine is adapted for operation as an AC synchronous motor, a brushless DC motor or a stepping motor in accordance with the magnetic flux generated by coil 20 in response to the energization of the coil. Furthermore, as the sections 302 and 304 are integral with the legs 312 and 316 and are thus adapted to transmit magnetic flux therethrough, the flux generated by coil 20 is communicated by the respective sections to the stator structure included in the device 22 to thus magnetically drive the rotor. As the shaft 124 of device 22 rotates, it is appreciated that the motive force generated thereby is appropriately transferred to the illustrated gear and pinion combinations. Consequently, selected gears of the illustrated gear assembly 339 exhibit selected speeds in accordance with the speed reducing ratios provided between each gear and its respective driving pinion.

Figure 7:
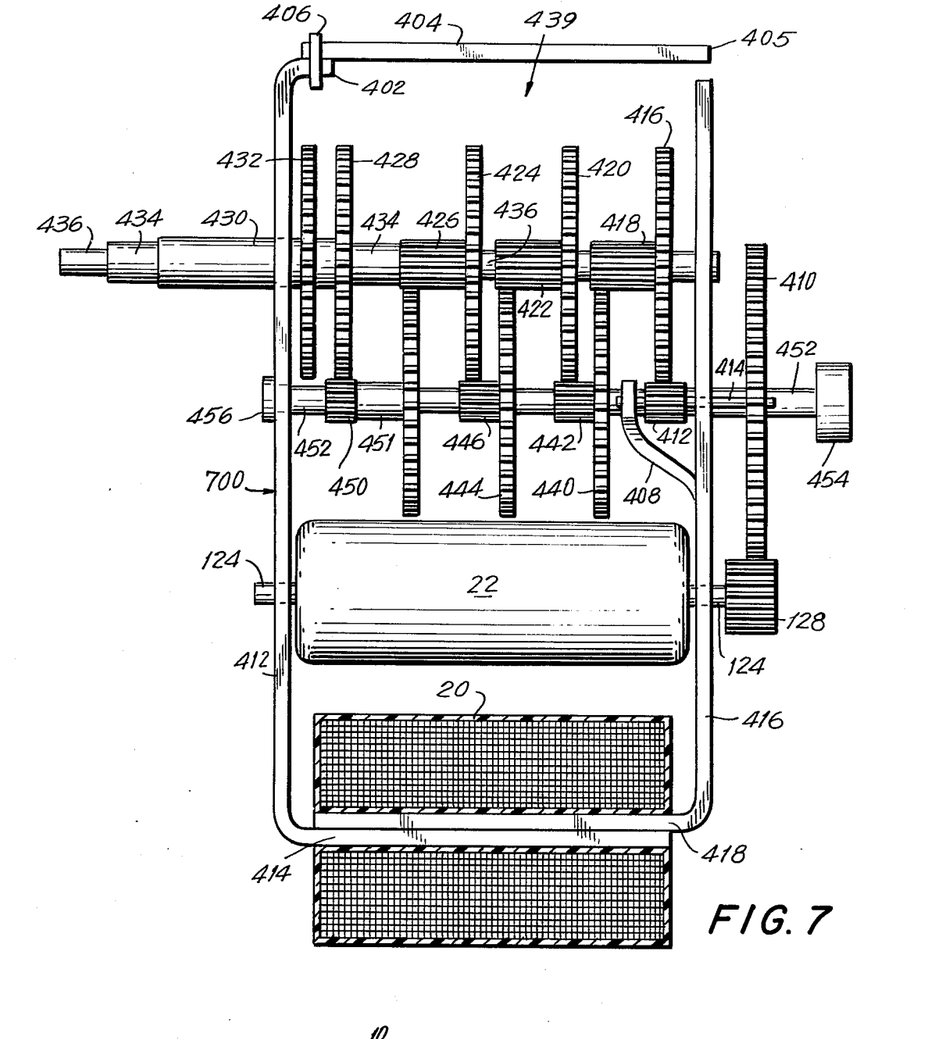
FIG. 7 is a side view of yet another illustrative embodiment of the electric rotating machine of the present invention and depicts one advantageous application thereof.

A further embodiment of the open frame electric-rotating machine of the present invention is illustrated in FIG. 7. As will be described hereinbelow, the illustrated embodiment is adapted to comprise an electromechanical timing device and includes a magnetic flux transmitting structure 700, a compact rotor-stator capsule device 22, an electro-magnetic coil 20 and a gear assembly 439. Similar to aforedescribed embodiments, the magnetic flux transmitting structure 700 comprises a frame including side members 412 and 416 and interconnecting members 414 and 418 therebetween. Side member 412 is additionally provided with a lip portion 402 for a purpose soon to be described. Although interconnecting members 414 and 418 are illustrated in overlapping relation, in an alternative embodiment the interconnecting members are disposed in abutting configuration on the manner depicted in FIG. 6.

Electromagnetic coil 20 is wound about the interconnecting members and is adapted to generate an appropriate magnetic flux in response to its energization. As is appreciated, the coil 20 may be supplied with AC or pulsed DC energy.

The compact rotor-stator capsule device 22 is mounted upon shaft 124, the latter being journaled for rotation in the structure 700. The stator structure of device 22 is in magnetic communication with the side members 412 and 416 through pole pieces, not shown, to thus provide a magnetic circuit through which the transmitted flux may communicate. Output pinion 128 is secured to the shaft 124 and is adapted to transfer the motive force derived at the shaft to the gear assembly 439.

As the illustrated apparatus is here adapted for use as a clock or other electro-magnetic timing device, the gear assembly 439 may be provided with particular speed reducing ratios to thus provide an indication of the passing of time. More particularly, if the timing device is to provide an indication of seconds, minutes and hours, it is manifest that specific gears included in the gear assembly 439 should, desirably, rotate at the speeds of one rotation per minute, one rotation per hour and one rotation for each 12 hour period, respectively. Consequently, the individual speed reducing ratios exhibited between a gear and its driving pinion are selected to provide the aforenoted speeds. A first gear 410, secured to a shaft 414, is disposed in meshing engagement with the pinion 128 to thus receive the motive power derived at shaft 124. The shaft 414 is journaled for rotation in the side member 416 and, additionally, includes a pinion 412 secured thereto. A section 408 is cut or stamped from the side member 416 and is similar to section 302 of aforedescribed FIG. 6. The shaft 414 is seen to extend between section 408 and side member 416 and the pinion 412 is secured intermediate the section and side member.

The gear assembly 439 comprises support shafts 436 and 452 upon which plural gear and pinion combinations are supported. The shaft 436 extends between the side members 412 and 416 of the structure 700 and is preferably disposed in a vertical plane spaced from the vertical plane in which the shaft 414 is disposed. The gearing arrangements supported on the respective shafts are thus displaced from each other. A gear 416 is disposed in meshing engagement with the pinion 412 and is further secured to a pinion 418. The gear and pinion combination 416, 418 is preferably rotatable about the support shaft 436. The pinion 418 is disposed in meshing engagement with a gear 440 to thereby drive the latter gear. As illustrated, the gear 440 is secured to a pinion 442 and such gear and pinion combination is supported on the shaft 452. For a purpose soon to become apparent it is preferable that such gear and pinion combination be rotatable about the shaft 452.

Shaft 452 may, if desired, comprise a sleeve and thus be coaxial with the shaft 414 or, alternatively, may be disposed in a vertical plane spaced from the vertical plane in which the shaft 414 is disposed. The pinion 442 is disposed in meshing engagement with a gear 420, the latter being secured to a pinion 422 and, additionally, to the shaft 436. The pinion 422 is, in turn, adapted to drive a gear 444 and is thus disposed in meshing engagement with the gear. The gear 444 is secured to a pinion 446 and such a gear and pinion combination is preferably rotatable about the support shaft 452. The pinion 446 drives a gear 424 and is disposed in meshing engagement therewith. The gear 424 is secured to a pinion 426 and, additionally, to the output shaft 434. The latter output shaft may comprise a sleeve in coaxial relationship with the shaft 436. Consequently, the gear and pinion combination 424, 426 is rotatable about the shaft 436.

The pinion 426 is adapted to drive a gear 448, the latter gear being secured to a pinion 450 by a connecting portion 451. The connecting portion may, preferably, be devoid of any gearing mechanism for a purpose soon to become apparent. The gear and pinion combination 448, 450 is preferably secured to the shaft 452. Additionally, the pinion 450 is disposed in meshing engagement with a gear 428, the latter gear being secured to the output shaft 430. The shaft 430 preferably comprises a sleeve member disposed in coaxial relationship with respect to output 434 and shaft 436, respectively.

A further gear 432 is mounted upon the output shaft 430 and is preferably rotatable thereabout. The gear 432 is mechanically coupled to the gear 428 by a unidirectional driving means well known to those of ordinary skill in the art such as, for example, a spring biased pole similar to the "no back" device described hereinabove with respect to FIG. 6, a cammed surface, or the like. As will be appreciated, the gear 432 is freely rotated with respect to the gear 428 in a first direction and is driven by the gear 428 and unidirectional driving means in a second direction.

The shaft 452 is journaled for rotation in side members 412 and 416 and is provided with a bearing member 456. Additionally, a knob 454 is secured to a remote end of shaft 452 and is adapted for manual operation. More particularly, the shaft 452 may be manually rotated and laterally displaced in accordance with the corresponding manipulation of the knob 454.

A flexible magnetic member 404 is mounted upon the lip portion 402 of the side member 412 and is held in place by a fastener 406. A remote end 405 of the flexible member 404 is juxtaposed in spaced relationship with the side member 416. As will soon become apparent, the flexible member, or vibratory reed, 404 is adapted to be magnetically attracted to the side member 416 when magnetic flux is generated therein so as to vibrate against the side member. In this manner, an audible alarm is sounded. Accordingly, conventional devices, long known to those of ordinary skill in the alarm clock art, are provided to restrain the reed 404 from contacting the side member 416 until the illustrated gear assembly has rotated into correspondence with a preset condition or time.

In the operation of the electro-mechanical timing device depicted in FIG. 7, it may be assumed that the rotor-stator device 22 is particularly designed to respond to the magnetic flux generated by electro-magnetic coil 20 to thereby drive the output pinion 128 at, for example, 3,600 rpm. If the gear 410 and output pinion 128 admit of a speed reducing ratio, for example, 7.5:1, the gear 410, together with shaft 414 and pinion 412, are driven at a speed of 480 rpm. If, now, the pinion 412 and gear 416 admit of the speed reducing ratio of, for example, 8:1, then gear 416, together with pinion 418, are driven at a speed of 60 rpm. A speed reducing ratio of 7.5:1 between the gear 440 and pinion 418 serves to drive gear 440, together with pinion 442, at a speed of 8 rpm. If, now, the pinion 442 and gear 420 admit of a speed reducing ratio of 8:1, then the gear 420 is driven at the speed of 1 rpm. If the gear 420 is secured to the shaft 436, it is appreciated that shaft 436 also rotates at the rate of speed of 1 revolution per minute. Consequently, the shaft 436 may be secured to the conventional second hand of a timing instrument to thereby drive the second hand at the appropriate speed.

If the gear 444 and pinion 422 admit of a speed reducing ratio of 7.5:1, then the gear 444, together with pinion 446, are driven at the speed of 8 revolutions per hour. A speed reducing ratio of 8:1 between the gear 424 and pinion 446 results in the rotation of gear 424 at a speed of one revolution per hour. Consequently, if the gear 424 is secured to the shaft 434, the shaft is likewise driven at the rate of one revolution per hour and, accordingly, may be coupled to a conventional minute hand of a timing instrument.

If the pinion 426 and gear 448 admit of the speed reducing ratio of, for example, 3:1, then the gear 448, together with pinion 450 and intermediate member 451, are driven at the speed of 1 revolution every 3 hours. A speed reducing ratio of, for example, 4:1 between the pinion 450 and gear 428 results in the gear 428 being driven at the rate of 1 revolution every 12 hours. Hence, the gear 428 may be secured to the shaft 430 to thus drive the shaft at the corresponding speed of 1 revolution every 12 hours. As is appreciated, the shaft 430 may be secured to a conventional hour hand of a timing instrument. Alternatively, the speed reducing ratio between pinion 450 and gear 428 may be, for example, 8:1, resulting in one rotation of gear 428 every 24 hours.

As the gear 432 is driven in correspondence with the rotation of the gear 428, the remote end 405 of the flexible member 404 is permitted to periodically contact the side member 416 when the gear 432 has rotated to a predetermined position. That is, when the gear assembly 439 has been driven to represent a time corresponding to the preset "alarm" time, an indication thereof will be obtained from the sound generated by the vibrating member 404.

The electro-magnetic timing device illustrated in FIG. 7, in conjunction with the indication provided by the periodic contact of the member 404 with the side member 416, comprises a timing instrument, such as an alarm clock. The setting of the alarm clock, i.e., the particular time at which the gear 432 rotates to the predetermined position, may be adjusted by any conventional devices that have long been used, such as, for example, by laterally displacing the shaft 452 such that the pinion 450 is positioned in meshing engagement with the gear 432. If knob 454 is then rotated to thus rotate the shaft 452 and pinion 450 secured thereto, it is appreciated that the gear 432 is correspondingly rotated. When the shaft 452 is then returned to its illustrated position whereby the pinion 450 admits of meshing engagement with the gear 428, it is appreciated that the rotation of the gear 428 will drive the gear 432 into its predetermined angular position. Of course, other means may be used to rotate the gear 432 aand thus set the alarm clock.

It is appreciated that as the shaft 124 rotates, the transfer of motive power from the pinion 128 to the illustrated gear assembly 439 results in the rotation of the shafts 436, 434 and 430, respectively, at the rates of one revolution per minute, one revolution per hour and one revolution for each 12 hour period. Thus, the illustrated apparatus is readily adapted to operate as a electro-mechanical timing instrument.

Figure 8:
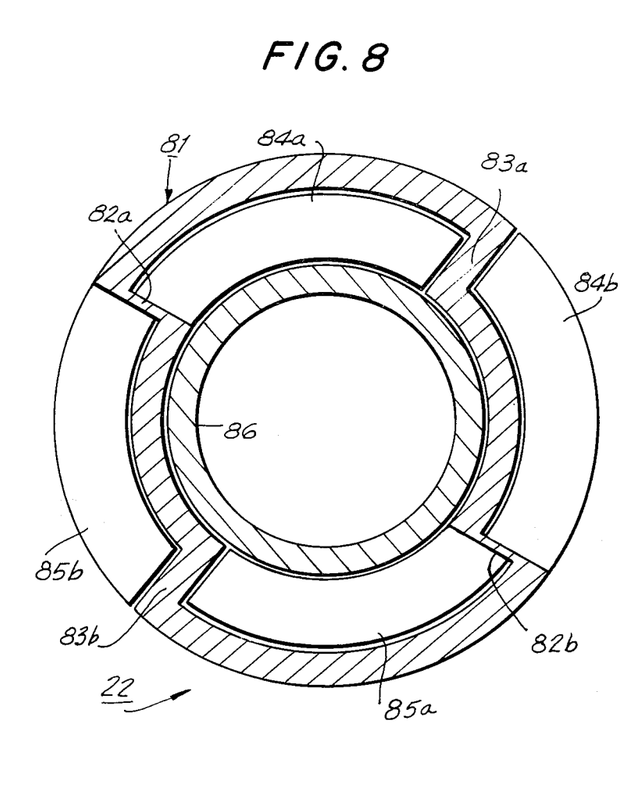
FIG. 8 is a sectional view of an exemplary embodiment of the stator structure of the capsule device used with the present invention.

Referring now to FIG. 8, there is illustrated an exemplary embodiment of an improved stator structure which may be incorporated into the capsule device 22. The stator structure is comprised of a crimped tube 81 and inner sleeve 86. A first pair of pole pieces 84a, 85b are formed of projecting legs that are lanced out from a stator end cap, not shown. A second pair of pole pieces 85a, 85b are likewise formed of projecting legs that are lanced out from an opposite stator end cap, not shown. A complete illustration of such stator end caps and associated projecting legs is shown in U.S. Pat. No. 3,495,111 which issued Feb. 10, 1970 to Arthur W. Haydon. The pole pieces 84a, 84b, 85a and 85b are made of soft steel or other suitable ferromagnetic material. The crimped tube 81 and inner sleeve 86 are of low resistance nonmagnetic metal such as copper or aluminum and are sweat-soldered together. Alternatively, the sleeve and crimped tube may be a single extruded piece.

The combination of crimped tube 81 and sleeve 86 comprise a shading member to receive the two pairs of pole pieces 84a, 84b and 85a, 85b. More particularly, those pole pieces 84a and 85a that are completely surrounded by the shading member are, of course, the shaded poles. As is apparent, those portions 82a and 82b of the crimped tube 81 that separate a shaded pole piece 84a, 85a from a pole admitting of opposite magnetic polarity 85b, 84b, respectively, are of thinner cross-sections than the portions 83a, 83b that separate the pole pieces of like magnetic polarity. It is recognized that since pole pieces 84a and 84b are formed from a common stator end cap, these pole pieces will exhibit like magnetic polarity when magnetic flux is communicated thereto. Similarly pole pieces 85a and 85b exhibit like magnetic polarity because they are formed from a common stator end cap.

Those of ordinary skill in the art will appreciate that the respective shading loops provided about pole pieces 84a and 85a delay the build-up of stator flux in those pole pieces to effect a unidirectional self-starting characteristic to the rotor. In the illustrated exemplary embodiment, the thin portions 82a and 82b, manifested by longitudinal grooves in the crimped tube, permit a shaded pole 84a, 85a to be disposed in closer proximity to an opposite unshaded pole 85b, 84b, respectively. Consequently, more primary flux is produced in the respective shaded pole piece, resulting in more current induced in the shading member. Hence, when the current collapses, more shaded flux is produced. Accordingly, the improved stator structure assures a unidirectional self-starting characteristic.

Figure 9:
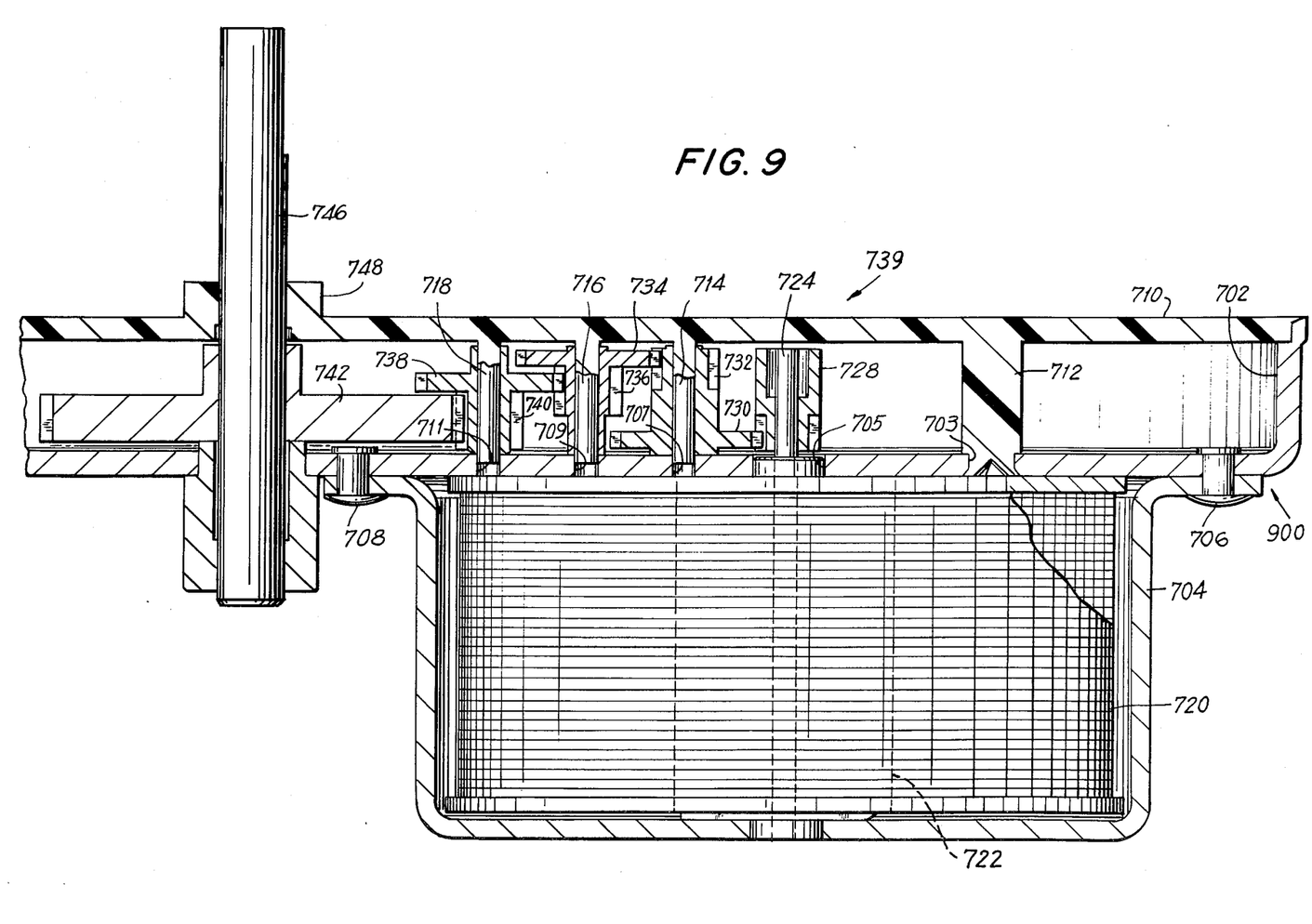
FIG. 9 is a side view of a still further embodiment of the electric rotating machine of the present invention.

Turning now to FIG. 9, there is illustrated a side view in partial section of a still further embodiment of the electric rotating machine in accordance with the present invention. In this embodiment the machine comprises a magnetic flux transmitting structure 900, an electromagnetic coil 720, a compact rotor-stator capsule device, here depicted merely by the broken lines 722, and a gear assembly 739. The electromagnetic coil 720 is here coaxial with the capsule device and encompasses that device. A coil housing or cup 704, formed of suitable magnetic flux transmitting material such as steel, is in magnetic flux communication with one side of the coil 720. The coil housing serves as a flux transmitting circuit and as a protective housing for the coil and capsule device. Accordingly, the housing 704 comprises a portion of the magnetic flux transmitting structure 900.

A gear assembly housing 702 is provided to cooperate with the coil housing 704 and thus comprises another portion of the magnetic flux transmitting structure. It may be observed that the gear assembly housing, which is fastened to the coil housing by suitable fastening members 706 and 708, together with the coil housing receive the coil and capsule device. The gear assembly housing is formed of suitable magnetic flux transmitting material and is in magnetic flux communication with another side of the coil 720. Accordingly, the capsule device 722 is supplied with the magnetic flux produced by the coil 720.

The gear assembly housing is provided with a plurality of apertures or, alternatively, recesses 703, 705, 707, . . . adapted to receive corresponding spacer elements, gear studs and the like. The spacer elements and gear studs, some of which are identified as spacer element 712 and as studs 714, 716, . . . , are formed of, and thus integral with, a gear plate 710. The gear plate is preferably of plastic construction and is positioned in overlying relation with respect to the gear assembly housing 702. The gear plate 71 and gear assembly housing cooperate to receive the gear assembly 739 and serve as a protective housing for the assembly. In the illustrated embodiment, the base plate 710 is formed with a depending spacer element that mates with the recess or aperture 703 of the gear assembly housing 702. Additionally, depending gear studs 714, 716, . . . , mate with the recesses or apertures 707, 709, . . . , respectively. Also, an output shaft bearing 748 is integrally formed of the gear plate 710. The bearing 748 is adapted to receive an output shaft 746, the latter being journalled for rotation in the bearing.

In an alternative embodiment, the gear plate 710 is formed of, for example, steel and is provided with recesses or apertures that are aligned with the illustrated recesses or apertures in the gear assembly housing. In this alternative embodiment, the plural spacer elements and gear studs are also formed of steel and extend between the gear plate and the gear assembly housing. The output shaft bearing is preferably formed of bronze. Of course, other suitable materials capable of performing an equivalent function may be used in the alternative embodiment.

Turning to the illustrated embodiment, corresponding gear and pinion combinations are supported on the plural gear studs. The gear and pinion combinations, which are preferably of nylon or plastic construction, provide a speed reducing function. As shown, a gear and pinion combination 730, 732 is supported on and rotatable about the gear stud 714. Similarly, a gear and pinion combination 734, 736 is supported on and rotatable about the gear stud 716. Further gear and pinion combinations are depicted; the actual number of such combinations determining the speed reducing ratio, as is appreciated. This gear assembly serves to transfer the motive force developed at the capsule shaft 724 to the output shaft 746. Accordingly, an output pinion 728 is secured to shaft 724, the latter extending through the aperture 705 in the assembly housing 702. The pinion 728 admits of meshing engagement with the gear 730 of the gear assembly to thereby impart rotary movement to the gear assembly. An output gear 742 is secured to the output shaft 746 and admits of meshing engagement with the pinion 740 of the gear assembly to thereby drive the output shaft. The cooperation between the intermediate gears is well understood and, therefore, need not be described.

The operation of the rotating machine illustrated in FIG. 9 is substantially similar to that described hereinabove with respect to FIGS. 1–7. Accordingly, in the interest of brevity, further detailed description is not provided. Hence, a rotating machine is illustrated wherein the gear assembly housing 702 and the coil housing 704 cooperate to provide a suitable magnetic circuit whereby the capsule device is energized and correspondingly driven. The gear assembly housing additionally serves as a support for the gear assembly 739.

In each of the foregoing embodiments, it should be readily apparent that any number of gear assemblies comprising any preferable number of gear and pinion combinations may be provided. Additionally, the various speed reducing ratios exhibited between a gear and its associated driving pinion may be any desired amount. Furthermore, a pinion may be driven by an associated gear to thus result in a speed increasing ratio to drive an output device at a rate of speed that exceeds the speed of the shaft upon which the rotor-stator device is mounted. Furthermore, the associated gear assemblies may include various combinations of gears and pinions to provide selected increases and decreases in developed angular velocities. Consequently, various output devices may be driven at selected speeds in accordance with the appropriate gear and pinion combinations. Each gear and each pinion may be constructed of suitable material, such as nylon, Teflon, brass or any other material heretofore utilized to produce gears. Consequently, each gear and pinion is, in this respect, conventional.

Another application of the open frame electric rotating machine described herein as an electro-mechanical pulse counter. When the rotor-stator capsule device is disposed in stepper motor configuration and the electro-magnetic coil is supplied with pulses, suitable indicator wheels, or the like, may be mechanically coupled to appropriate gears included in the gear assembly to provide an indication of the number of pulses supplied to the coil. By selecting appropriate speed reducing ratios between the gear and pinion combinations a decimal or other desirable type count may be indicated.

While the invention has been particularly described with reference to various embodiments of electric rotating machines, it will be obvious that this invention may be utilized with any number of devices to be driven at selected operating speeds. Consequently, it is apparent that the foregoing and various other changes and modifications in form and details may be made without departing from the spirit and scope of the invention. It is therefore intended that the appended claims be interpreted as including all such changes and modifications.

What is claimed is:

1. An electric rotating machine, comprising:
a rotor-stator device having a permanent magnet cylindrical rotor mounted on a first shaft and a stator structure in cooperating relationship with said rotor, said stator structure including a plurality of pole pieces;
a magnetic flux transmitting frame including a base plate having an integral upstanding member, and an L-shaped member having a first leg disposed in overlying relation with said upstanding member and a second leg spaced from and parallel with said base plate, said first shaft being supported by and rotatable in said base plate and said second leg and said plurality of pole pieces being in magnetic communication with said base plate and said second leg;
a gear assembly housing having side walls and a partitioning wall, said housing and said base plate cooperating to define a compartment; said partitioning wall having a plurality of gear studs formed thereon and extending to said base plate for supporting gears thereon; said gears being disposed within said compartment in intermeshing, speed changing relationship whereby selected ones of said gears exhibit selected angular velocities;
an electromagnetic coil wound about said overlying first leg and said upstanding member for supplying magnetic flux to energize said stator structure to cause said rotor to rotate; and means for transferring the motive force generated by said rotor to said gears.

2. An electric rotating machine in accordance with claim 1 wherein said base plate is a cover for said gear assembly housing.

3. An electric rotating machine in accordance with claim 2 wherein said gear assembly housing further includes a bottom wall and wherein an output shaft extends between said base plate and said bottom wall, said output shaft supporting gear means that are driven by said gears supported by said gear studs.

* * * * *